United States Patent

Reed

[15] 3,646,498

[45] Feb. 29, 1972

[54] ELECTRICAL CIRCUIT CONTROL APPARATUS

[72] Inventor: Robert T. Reed, Moorestown, N.J.

[73] Assignee: Walton Products Inc., Broomall, Pa.

[22] Filed: May 19, 1970

[21] Appl. No.: 38,775

[52] U.S. Cl. ..............................339/48, 200/16 A, 213/1.3

[51] Int. Cl. ..............................H01r 25/00

[58] Field of Search..............213/1.3; 200/16 A, 82 C, 83 G, 200/153 T, 166 BE, 166 BF, 166 BH; 339/47–49, 255

[56] References Cited

UNITED STATES PATENTS 1,349,405 8/1920 Brown..............................339/48 X 1,300,789 4/1919 Tomlinson..............................213/1.3 X 1,223,222 4/1917 Tomlinson..............................339/48 X 1,571,222 2/1926 Woernley..............................339/48 X

*Primary Examiner*—Marvin A. Champion

*Assistant Examiner*—Terrell P. Lewis

*Attorney*—Zachary T. Wobensmith, 2nd

[57] ABSTRACT

Electrical circuit control apparatus and more particularly a spring-loaded contact pin assembly is described for making and breaking electrical circuits, the structure being particularly suited for circuits of railroad cars which are coupled and uncoupled and which cannot have exposed electrically live contact pins.

6 Claims, 1 Drawing Figure

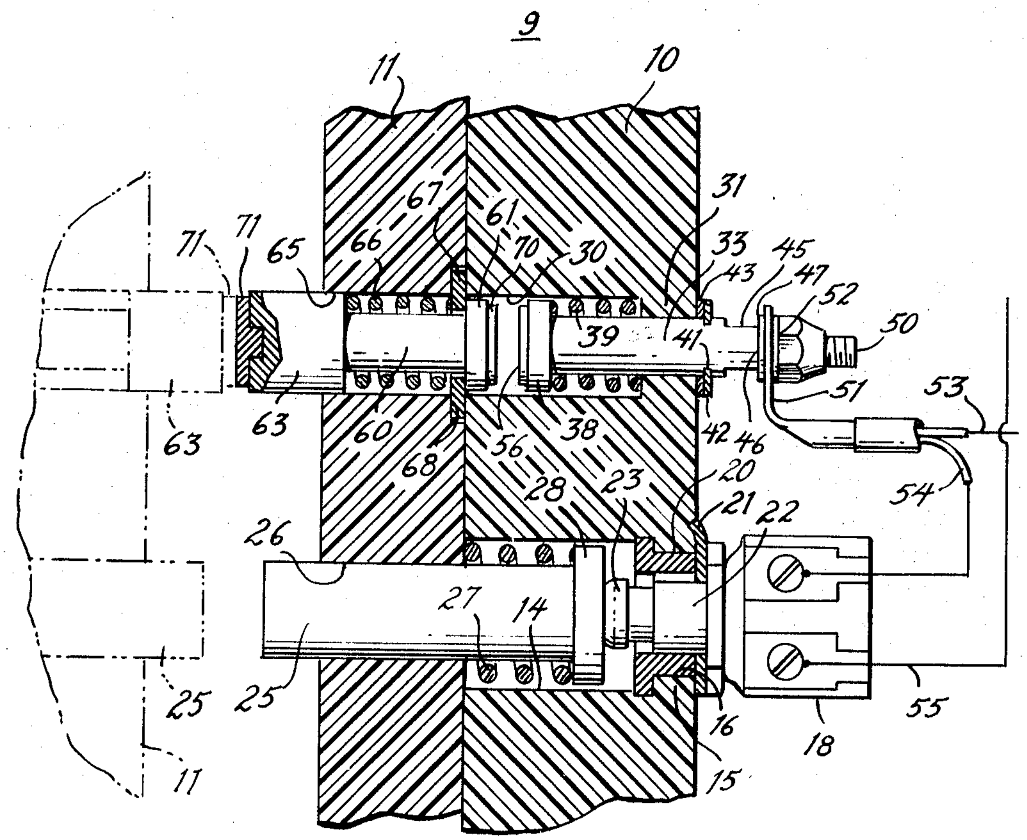
INVENTOR.
ROBERT T. REED
BY [signature]
ATTORNEY.

ELECTRICAL CIRCUIT CONTROL APPARATUS

BACKGROUND OF THE INVENTION

1. Field of the Invention

This invention relates to electrical circuit control apparatus and more particularly to electrical circuit control apparatus of the contact pin type used with automatic railroad coupling and uncoupling equipment.

2. Description of the Prior Art

The use of automatic coupling and uncoupling equipment for railroad cars is well known and electrification of railroad cars by means of various contact elements between cars operated in conjunction with automatic coupling and uncoupling equipment is also well known. In the previously available circuit control apparatus live contact pins or elements are exposed to the weather when the cars are uncoupled and present the danger of electrical shock and easy susceptibility to damage. The electrical circuit control apparatus of the present invention does not have the above defects and has additional advantages that are lacking in previously available devices.

SUMMARY OF THE INVENTION

In accordance with the invention electrical circuit control apparatus of the contact pin type is provided which is particularly useful in conjunction with automatic coupling and uncoupling devices for railroad cars and which includes an electrically insulated block assembly containing spring-loaded contact pins which are energized by contact with an adjacent contact pin upon movement to coupling position and which are deenergized by uncoupling of the railroad cars.

The principal object of the invention is to provide an electrical circuit control apparatus which is particularly suited for railroad cars and eliminates any live exposed electrical contacts when the railroad cars are uncoupled.

A further object of the invention is to provide an electrical circuit control apparatus which provides improved protection of electrical circuits and easier testing and maintenance of the circuits.

A further object of the invention is to provide an electrical circuit control apparatus which eliminates current creep between live circuits due to dirt and reduces the danger of short circuits during railroad car washing.

A further object of the invention is to provide electrical circuit control apparatus which can be used with existing systems regardless of the type of installation.

A further object of the invention is to provide electrical circuit control apparatus which is simple and inexpensive to construct but sturdy and reliable in operation.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawing forming part thereof, in which the FIGURE illustrates the electrical circuit control apparatus in section and showing the apparatus in uncoupled deenergized condition.

It should, of course, be understood that the description and drawing herein are illustrative merely and that various modifications and changes can be made in the structure without departing from the spirit of the invention.

DESCRIPTION OF THE PREFERRED EMBODIMENT

Referring now more particularly to the drawing, the electrical circuit control apparatus includes as one component thereof a block assembly 9 which comprises an inner block 10 and an outer block 11 bonded together in well-known manner and composed of insulating material such as an electric grade phenolic composition of well-known type. The inner block 10 at the bottom has a bore 14 therein which extends to the right to a shoulder 15, where it becomes of reduced diameter and continues as bore 16 to the outside of the block 10. A switch 18 of well-known type which is in a normally closed circuit in the free or uncoupled position, and which may be a microswitch, is mounted in a bushing 20 in bore 16 which bushing 20 is retained therein by a split ring 21. The switch 18 includes a housing 22 and has an actuator 23 extending therefrom. In bore 14 a lower operating pin 25 is provided slidably mounted therein and urged to the right against actuator 23 by a spring 27 on the pin 25 which spring 27 engages the head 28 of the pin 25, and also the outer block 11 in which the pin 25 is slidably mounted in a bore 26.

The block 10 is provided with another bore 30 above and parallel to the bore 14 which terminates at the right at shoulder 31 and continues at reduced diameter as coaxial bore 32 to the outside of the block 10. An inner pin 33 is provided freely slidably mounted in bore 30 of block 10 and being slidably engaged in the reduced diameter bore 32. The pin 33 is provided with a head 38 thereon with which a spring 39 carried on pin 33, is engaged, which spring abuts shoulder 31 of block 10 and therefore urges the pin 33 to the left. The pin 33 at the right outside block 10 has a circumferential groove 41 with a retainer ring 42 therein and a spacer washer 43 between the ring 42 and the block 10, to limit the leftward travel of pin 33. The pin 33 to right of groove 41 has a flat portion 45 of reduced size and a shoulder 46 and thereon a reduced diameter threaded portion 50. A lug 51 is held on portion 50 between washer 47, shoulder 46 and a nut 52 which is in threaded engagement with portion 50.

The lug 51 has a conductor 53 connected to it and to one side of the car circuit (not shown). The conductor 53 also has a conductor 54 connected thereto and to one side of switch 18. A conductor 55 is connected to the other side of switch 18 and to the car circuit (not shown) for the purpose of providing a return or looped circuit within the car circuit when car is not coupled to another car.

The head 38 of pin 33 is provided with a pure silver contact 56, to provide a good electrical contact.

To the left of pin 33 an outer pin 60 is provided also slidably carried in a bore 65 in the block 11. The pin 60 has an enlarged head 61 at one end and an enlarged head 63 integral therewith at the other end. The pin 60 is mounted in a bore 65 of block 11 and has a spring 66 thereon engaged at the left with head 63 and at the right with a washer 67 which washer 67 is carried in recess 68 of block 11 and retained therein by block 10.

The head 61 has a pure silver contact 70 thereon for engagement with contact 56 of head 38. The head 63 has a contact 71 at the left which is pure silver to provide a good electrical contact.

Opposite to the blocks 10 and 11, and as shown in phantom, another pair of similar blocks can be provided, and with pins 25, 63 and 33, or any other type of engaging contact pins as desired.

Rows of pins 63 and 33 or of pins 25 can be provided if desired in the blocks 10 and 11 for controlling a plurality of circuits but it is not believed to be necessary to illustrate the same because of their repetitive character.

The mode of use will now be pointed out. Should coupling be desired with connection of the electric circuits between the railroad cars then the coupler assembly seen at left in phantom is moved to the right to engage contact 71 of head 63 and cause pin 60 to move to the right, against the force of spring 66, to bring contact 70 into engagement with contact 56 and complete the circuit through conductor 53. The pin 25 is also engaged and moved to switch 18 to disconnect the circuit through conductor 55, which in the uncoupled condition provided a return circuit or looped circuit from conductor 53 through conductors 54 and 55 to controls.

The coupler assembly at the left in phantom is moved to the left for uncoupling which breaks the circuit and deenergizes the car circuit (not shown) in reverse of the manner as described above. At the same time allowing switch 18 to be released, closes the contacts within switch 18 thus providing for looping of circuits through conductors 53, 54 and 55.

It will thus be seen that apparatus has been provided with which the objects of the invention are attained.

I claim:

1. Electrical circuit control apparatus comprising block means,
a first contact pin slidably mounted in said block means,
first resilient means urging said first contact pin in a predetermined direction and first stop means limiting the movement of said first contact pin,
a second contact pin axially aligned with said first contact pin, slidably mounted in said block means with an exposed head portion extending outwardly beyond said block means and having an outer contact end and an inner contact end,
second resilient means urging said second contact pin out of engagement with said first contact pin,
said second contact pin in its out of engagement position being in deenergized condition but being movable into engagement with said first contact pin and in conducting condition in relation thereto,
an additional circuit control means mounted in said block means, and
an actuator for said additional circuit control means in parallel relation to said second contact pin, whereby the circuit is continuously closed.

2. Electrical circuit control apparatus comprising
block means including an outer block and an inner block with inner faces in engagement and with a plurality of aligned bores,
a first contact pin slidably mounted in a first bore in said inner block,
first resilient means in said first bore urging said first contact pin in a predetermined direction and first stop means limiting the movement of said first contact pin toward said outer block,
a second contact pin axially aligned with said first contact pin and slidably mounted in a second bore in said outer block and having an exposed head portion extending outwardly beyond said outer block and an inner contact end disposed in said second bore in said inner block,
second resilient means in said second bore urging said second contact pin out of engagement with said first contact pin,
said second contact pin in its out of engagement position being in deenergized condition but being movable into engagement with said first contact pin and in conducting condition in relation thereto.

3. Electrical circuit control apparatus as defined in claim 2 in which
said second contact pin has an outer head with a contact end thereon.

4. Electrical circuit control apparatus as defined in claim 2 in which
said exposed head portion of said second contact pin is an enlarged head,
a fixed abutment is provided in said block means, and
said second resilient member is interposed between said enlarged head and said fixed abutment.

5. Electrical circuit control apparatus as defined in claim 2 in which
an additional circuit control means is mounted in said block means, and
an actuator is provided for said additional circuit control means in parallel relation to said second contact pin.

6. Electrical circuit control apparatus as defined in claim 2 in which
said first contact pin has an abutment thereon in said first bore,
said first resilient member is disposed in said first bore and is interposed between said abutment and a fixed portion of said inner block.

* * * * *